United States Patent Office

3,845,059
Patented Oct. 29, 1974

---

3,845,059
PREPARATION OF N,N'-DIETHANOL PIPERAZINE
Alvin F. Beale, Jr., Lake Jackson, Tex., assignor to The Dow Chemical Company, Midland, Mich.
No Drawing. Filed June 19, 1972, Ser. No. 264,704
Int. Cl. C07d 51/70
U.S. Cl. 260—268 SY     8 Claims

ABSTRACT OF THE DISCLOSURE

Diethanolamine is reacted with urea or a urea pyrolyzate (e.g. biuret, triuret, or cyanuric acid) to form N,N'-diethanol piperazine.

BACKGROUND OF THE INVENTION

N,N'-diethanol piperazine has been previously prepared by the condensation of piperazine with ethylene chlorohydrin as reported in *J. Am. Chem. Soc.*, Vol. 55, p. 3823 (1933). The compound has been reported to have pharmacological properties as an anesthetic or sedative in *Heterocyclic Compounds*, Vol. 6, published by John Wiley & Sons, Inc. of New York.

SUMMARY OF THE INVENTION

It has now been found that N,N'-diethanol piperazine is efficiently and inexpensively prepared by reacting diethanolamine with urea or a urea pyrolyzate.

Urea pyrolyzates are obtained by thermally condensing urea to form, principally, biuret, triuret, and/or cyanuric acid; ammonia is driven off as the urea condenses. Other cyclic urea pyrolyzates (besides cyanuric acid) such as isocyanuric acid, ammelide, ammeline, etc. are also prepared by autocondensation of urea. The thermal condensing of urea to form pyrolyzates is a well known reaction and requires no further description herein. In *Chemical Reviews*, Vol. 56, pp. 95–197, there is a review titled "Biuret and Related Compounds" by Frederick Kurzer which describes the condensation of urea to biuret and other compounds.

DETAILED DESCRIPTION OF THE INVENTION

The reaction of urea with diethanolamine to form N,N'-diethanol piperazine can be stoichiometrically illustrated by the following balanced equation:

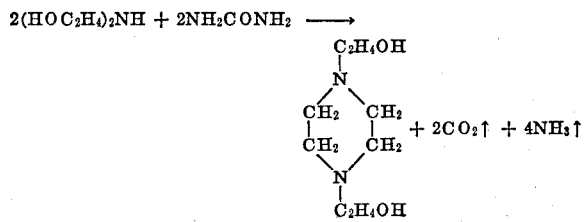

The reaction of biuret with diethanolamine to form N,N'-diethanol piperazine can be illustrated as follows:

$2(HOC_2H_4)_2NH + NH_2CONHCONH_2 \longrightarrow$

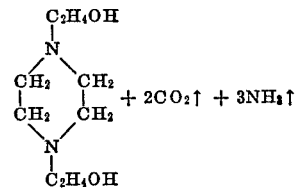

$+ 2CO_2\uparrow + 3NH_3\uparrow$

The following chart illustrates the balanced stoichiometry for reacting diethanolamine with urea, biuret, triuret, and cyanuric acid.

| Moles of $(HOC_2H_4)_2NH$ | Name of reactant | Empirical formula of reactant | Moles of reactant | Reaction products Moles of N,N'-diethanol piperazine | Moles of $CO_2$ | Moles of $NH_3$ |
|---|---|---|---|---|---|---|
| 2 | Urea | $CH_4N_2O$ | 2 | 1 | 2 | 4 |
| 2 | Biuret | $C_2H_5N_3O_2$ | 1 | 1 | 2 | 3 |
| 6 | Triuret | $C_3H_6N_4O_3$ | 2 | 3 | 6 | 8 |
| 6 | Cyanuric acid | $C_3H_3N_3O_3$ | 2 | 3 | 6 | 6 |

The reaction has been found to be specific for diethanolamine since analogous dialkanolamines do not give corresponding dialkanol-substituted cyclic structures containing nitrogens within a carbon ring.

The reaction of diethanolamine with reactants urea, biuret, triuret, or cyanuric acid may be carried out using only one of said reactants or may be a combination of two or more of said reactants.

The reaction may be carried out in an inert solvent or diluent or may be carried out using an excess of the diethanolamine as the reaction medium.

When excess diethanolamine is employed as the reaction medium, it can be cycled back to the reactor and employed along with make-up diethanolamine and fresh urea or urea pyrolyzate added. When an inert carrier or solvent is employed as the reaction medium, it can be re-cycled back to the reactor after the product is substantially removed.

It will be understood by persons skilled in the art that inert carriers useful in the present invention may be solvents for either the diethanolamine or the urea (or urea pyrolyzates) or both. They may also be solvents for the desired product (viz, N,N'-diethanol piperazine). It is also easily understood that the solubilizing ability of an inert carrier will usually vary with the temperature. It is advisable to perform the present process in a medium in which the desired product is easily precipitated while keeping the reactants in a non-precipitated state. Inert liquids which are not solvents for the reactants or the desired product may be employed as the reaction medium, but are not preferred.

The reaction product, N,N'-diethanol piperazine, is easily precipitated from the reaction solution by cooling or by adding a non-solvent which is miscible with the reaction solvent, depending on the situation. Preferably, the reaction is carried out in a medium in which the reactants are soluble, but in which the desired product (diethanol piperazine) will precipitate when formed or when cooled.

The ratio of the reactants to each other is not critical as the reaction proceeds according to the stoichiometrical equation illustrated hereinbefore. Ordinarily an excess of the diethanolamine is employed, either because the diethanolamine is to serve as the reaction medium or because it is usually more soluble, in whatever reaction medium is used, than the urea (or urea pyrolyzate) or the desired product. This helps in separating the product from residual diethanolamine. It is best to select conditions in which all the urea or urea pyrolyzate is consumed, thus simplifying the purification of the product.

As the reaction progresses, $CO_2$ and $NH_3$ are evolved and released from the reaction. An inert gas purge or sparge may be employed to speed the release of $CO_2$ and $NH_3$. Reduced pressure may also be employed in some instances to speed the release of the $CO_2$ and $NH_3$ from the reaction.

Even though the reaction will proceed at sub-atmospheric, atmospheric, or super-atmospheric pressures, atmospheric pressures are preferably employed for economic reasons and also to provide for easy purging of the evolved $CO_2$ and $NH_3$. Super-atmospheric pressures retard the release of $CO_2$ and $NH_3$ from the reaction mixture, thus are not preferred.

As will be readily apparent to those skilled in the art, the vapors and gasses leaving the reactor can be easily trapped by conventional methods either for re-cycling or for preventing contamination of the ambient atmosphere.

Broadly speaking the reaction can be carried out at temperatures ranging from about 70° C. to about 268° C. (the boiling point of diethanolamine). At 70° C. the reaction is very slow and it would take many days to get an appreciable yield of desired product. For best operation, a range of about 110°–175° C., preferably about 130°–165° C. should be used for urea, biuret, and triuret. The reaction proceeds as slower rates at lower temperatures; at higher temperatures the reaction is accelerated but the tendency to form undesirable side-products is also encountered.

When cyclic urea pyrolyzates, such as cyanuric acid, are used in the reaction, the temperature should be maintained in the range of about 165°–265° C., and preferably about 215°–240° C. Here again, one finds that at lower temperatures the reaction is quite slow and at higher temperatures, the formation of unwanted side products is likely to be encountered.

In those instances in which an inert carrier is used as the reaction medium, the boiling point of the carrier may limit the reaction temperature. For this reason, a carrier should be selected which has a boiling point at least as high as the desired operating temperature.

In the following examples, the yield percentages reported are the percentages of product theoretically obtainable assuming 100% conversion of the urea or urea pyrolyzate.

EXAMPLE 1

Into 315 gms. of diethanolamine was stirred 129 gms. of cyanuric acid. The mixture was heated, with stirring, at 205–225° C. for 8 hours under a $N_2$ purge. When the mixture was cooled, a precipitate formed which was filtered out, washed with acetone, and dried. The dried precipitate weighed 41 gms. and was identified by infrared analysis (and confirmed by nuclear magnetic resonance and elemental analysis) as N,N'-diethanol piperazine. The yield is calculated as about 16% (theoretical).

EXAMPLE 2

For this run a re-cycle filtrate from a previous run was employed as the reaction solvent. The solvent was tetraethylene glycol dimethyl ether which contained a small amount of a previous reaction product.

To 11 lbs. 15 oz. of the re-cycle filtrate was added 3 lbs. 8 oz. of diethanolamine and 2 lbs. of urea. The mixture was heated, with stirring, at 145°–150° C. for 20 hours under a $N_2$ purge. A precipitate was formed when the mixture was cooled and it was filtered out and washed with acetone. The dried ppt. weighed 1 lb. 12 oz. and was analyzed as N,N'-diethanol piperazine. The yield is calculated as about 61% (theoretical).

EXAMPLE 3

The filtrate from Example 2 above (12 lbs., 3 oz.) was mixed with 1 lb. 7 oz. of tetraethylene glycol dimethyl ether, 1 lb. 3 oz. of urea, and 2 lb. 2 oz. of diethanolamine.

The mixture was heated under a $N_2$ purge, with stirring, at 135° C. for 24 hours, then at 145° C. for 19 hours. The mixture was cooled, the precipitate was filtered out, washed with acetone, dried and found to weigh 1 lb. 6 oz. It was analyzed as N,N'-diethanol piperazine. The yield is calculated as about 79.5% (theoretical).

EXAMPLE 4

A stirred mixture of 105 gms. of diethanolamine and 60 gms. of urea was heated under a $N_2$ purge at 150° C. for about 7 hours. During this time the evolving $NH_3$ was passed through an acid scrubber and was sufficient to neutralize 225 ml. of 7.6N $H_2SO_4$.

The mixture was cooled and 100 ml. of triethylene glycol dimethyl ether was added. The precipitate was filtered out and washed with acetone. The amount of dried product obtained (N,N'-diethanol piperazine) represented a 15% yield (theoretical).

EXAMPLE 5

A stirred mixture of 130 gms. of diethanolamine and 60 gms. of urea was heated under a $N_2$ purge at 150° C. for 8 hours. During this time the evolving $NH_3$ neutralized 235 ml. of 7.6N $H_2SO_4$ in a scrubber. After cooling, 50 ml. of triethylene glycol dimethyl ether was added, the precipitate was filtered out, washed with acetone, and dried. The dried ppt., analyzed as N,N'-diethanol piperazine, weighed 24.5 gms. which was about 28% yield (theoretical).

EXAMPLE 6

In similar manner to the above Example 5, 158 gms. of diethanolamine and 60 gms. of urea were reacted at 150° C. for 22 hrs. with 255 ml. of 7.6N $H_2SO_4$ being neutralized by the evolving $NH_3$. Mixture was cooled, 100 ml. of triethylene glycol dimethyl ether was added, the precipitate was filtered out, washed with acetone, and dried. The dried product (N,N'-diethanol piperazine) weighed 33 gms. which represented about 38% yield (theoretical).

EXAMPLE 7

In similar manner to Example 5 above, 210 gms. of diethanolamine and 60 gms. of urea were reacted at 150° C. for 16 hours during which time 235 ml. of 7.6N $H_2SO_4$ was neutralized by the evolving $NH_3$. The mixture was cooled, 100 ml. of triethylene glycol dimethyl ether was added, the precipitate was filtered out, washed with acetone, and dried. The dried product (N,N'-diethanol piperazine) weighed 25.4 gms. which represented a yield of about 29% (theoretical).

EXAMPLE 8

Reacted 2 moles of diethanolamine and 1 mole of biuret under inert ($N_2$) atmosphere at 135° C. for about 15 hours. Isopropanol was employed to precipitate the product and the product was recrystallized from hot isopropanol and identified as N,N'-diethanol piperazine.

EXAMPLE 9

For this example, a urea pyrolyzate, obtained by thermally condensing urea, was employed as the reactant along with diethanolamine. The urea pyrolyzate contained about 69.8% biuret, about 10.4% urea, about 11.8% triuret, about 7.5% cyanuric acid, and about 0.4% ammelide.

The molar ratio of diethanolamine to urea pyrolyzate (nitrogenous product) was about 2.25.

The mixture was heated, under $N_2$ purge, at 145° C. for 14 hours. Product analyzed as N,N'-diethanol piperazine was separated by vacuum distillation at 180° C. and trapped at room temperature.

EXAMPLE 10

In similar manner to Example 8 above, reacted (under $N_2$ purge) 2 moles of diethanolamine per mole of biuret at 170° C. for 6 hours 50 minutes and obtained greater yield of N,N'-diethanol piperazine than when reaction was done at 135° C. for 15 hours.

EXAMPLE 11

According to procedures described herein, the desired product, N,N'-diethanol piperazine is prepared in appreciable yield by reacting diethanolamine with a reactant selected from the group consisting of urea, biuret, cyanuric acid, and triuret or mixtures of two or more of these reactants.

The invention is illustrated by, but is not limited to, the foregoing examples. It will be obvious to those skilled in the art that various changes and modifications may be made in the illustrations without departing from the true spirit and scope of the invention. The invention is limited only by the following claims.

What is claimed is:

1. The process which comprises reacting diethanolamine with one or more compounds selected from the group consisting of urea, biuret, triuret, cyanuric acid, isocyanuric acid, ammelide, and ammeline to form N,N'-diethanol piperazine, said reacting being performed at a pressure less than about superatmospheric and at a temperature in the range of about 70° C. to about 268° C.

2. The process of Claim 1 in which diethanolamine is reacted with urea.

3. The process of Claim 1 wherein diethanolamine amine is reacted with one or more compounds selected from the group consisting of urea, biuret, triuret, and cyanuric acid.

4. The process of Claim 1 wherein the diethanolamine is present in an amount which is in excess of the amount required stoichiometrically.

5. The process of Claim 1 when performed in an inert carrier.

6. The process of Claim 1 when performed with an inert gaseous purge or sparge.

7. The process of Claim 1 when performed at a temperature in the range of 110°–175° C. when diethanolamine is reacted with one or more compounds selected from the group consisting of urea, biuret, triuret and in the range of 165°–265° C. when diethanolamine is reacted with one or more compounds selected from the group consisting of cyanuric acid, isocyanuric acid, ammelide, and ammeline.

8. The process of Claim 4 wherein the excess of diethanolamine is an amount sufficient to serve as the reaction medium.

References Cited
UNITED STATES PATENTS

| | | | |
|---|---|---|---|
| 2,868,791 | 1/1959 | Steele | 260—268 SY |
| 2,871,259 | 1/1959 | Levy | 260—482 C |
| 2,834,799 | 5/1958 | Sowa | 260—463 |

ALTON D. ROLLINS, Primary Examiner

PO-1050
(5/69)

UNITED STATES PATENT OFFICE
CERTIFICATE OF CORRECTION

Patent No. 3,845,059  Dated Oct. 29, 1974

Inventor(s) Alvin F. Beale, Jr.

It is certified that error appears in the above-identified patent and that said Letters Patent are hereby corrected as shown below:

Column 2, in the Table under Reaction products, in the heading of "Moles of $Co_2$" the $Co_2$ should be changed to $CO_2$.

Signed and sealed this 22nd day of April 1975.

(SEAL)
Attest:

RUTH C. MASON
Attesting Officer

C. MARSHALL DANN
Commissioner of Patents
and Trademarks